United States Patent
Weyhmueller et al.

(10) Patent No.: US 6,966,607 B2
(45) Date of Patent: Nov. 22, 2005

(54) DEVICE FOR TENSIONING A SAFETY BELT WITH A PYROTECHNIC LINEAR DRIVE

(75) Inventors: Guenter Weyhmueller, Alfdorf (DE); Wilfried Bieg, Eschach (DE)

(73) Assignee: TRW Automotive GmbH, Alfdorf (DE)

(*) Notice: Subject to any disclaimer, the term of this patent is extended or adjusted under 35 U.S.C. 154(b) by 21 days.

(21) Appl. No.: 10/881,402

(22) Filed: Jun. 30, 2004

(65) Prior Publication Data
US 2005/0029856 A1  Feb. 10, 2005

(30) Foreign Application Priority Data
Aug. 7, 2003  (DE) ............... 203 12 222 U

(51) Int. Cl.⁷ ............................................ B60R 21/00
(52) U.S. Cl. ....................................... 297/472; 297/480
(58) Field of Search ................ 297/472, 471, 297/464, 470, 476, 477, 479, 480; 280/806; 188/371

(56) References Cited

U.S. PATENT DOCUMENTS

| 3,180,082 A | | 4/1965 | Benditt et al. | |
|---|---|---|---|---|
| 4,927,175 A | * | 5/1990 | Fohl | 280/806 |
| 5,364,168 A | * | 11/1994 | Nishizawa et al. | 297/476 |
| 5,568,940 A | * | 10/1996 | Lane, Jr. | 280/806 |
| 5,927,756 A | * | 7/1999 | Wier | 280/806 |
| 5,984,350 A | * | 11/1999 | Hagan et al. | 280/735 |
| 6,264,281 B1 | * | 7/2001 | Dukatz et al. | 297/480 |
| 2003/0122362 A1 | * | 7/2003 | Ukita et al. | 280/806 |

FOREIGN PATENT DOCUMENTS

DE 9308273.8  9/1993

* cited by examiner

Primary Examiner—Milton Nelson, Jr.
(74) Attorney, Agent, or Firm—Tarolli, Sundheim, Covell & Tummino L.L.P.

(57) ABSTRACT

A device for tensioning a safety belt includes a pyrotechnic linear drive. The linear drive includes a gas generator (10) with an ignition unit (16), and a protective cap (18) to secure the gas generator (10) before and during the assembly of the gas generator (10). In the installed state of the device, at least a portion of the protective cap (18), after the igniting of the gas generator (10), represents a function element.

8 Claims, 3 Drawing Sheets

DEVICE FOR TENSIONING A SAFETY BELT WITH A PYROTECHNIC LINEAR DRIVE

TECHNICAL FIELD

The invention relates to a device for tensioning a safety belt, the device comprising a pyrotechnic linear drive.

BACKGROUND OF THE INVENTION

Devices for tensioning a safety belt comprising a pyrotechnic linear drive are known. It is also known that the linear drive of such a device may include a gas generator comprising an ignition unit and a protective cap to secure the gas generator before and during the construction of the gas generator.

In a vehicle collision, the belt slack of a safety belt which is being worn can be eliminated by a belt- or buckle tensioner. Various drive designs are known for such devices. Tensioning devices with pyrotechnic linear drives usually have a piston/cylinder unit, the piston representing a drive element accelerated by the compressed gas provided by the gas generator, the movement of which is used for the belt tensioning. If the belt tensioner is equipped with a force-limiting arrangement, the belt band force acting on the occupant can be reduced through a controlled decrease of the kinetic energy of the vehicle occupant. In order to ensure protection for the persons involved during transportation and during the assembly of the gas generator of the pyrotechnic linear drive, the gas generators are provided with a protective cap. The protective cap additionally offers protection from damage and also from moisture, dirt and the like. On assembly of the linear drive, the protective cap is then removed, in order to couple the gas generator to the piston/cylinder unit.

SUMMARY OF THE INVENTION

The invention provides a pyrotechnic linear drive, which can be handled in a more uncomplicated manner and which, as a whole, is able to be produced and installed at a more favourable cost.

A device for tensioning a safety belt according to the invention comprises a pyrotechnic linear drive including a gas generator comprising an ignition unit, and a protective cap to secure the gas generator before and during the assembly of the gas generator. According to the invention, in the installed state of the device, at least a portion of the protective cap, after the igniting of the gas generator, represents a function element. Thus, the protective cap is kept on the gas generator even after the installation of the tensioning device into the vehicle, and adopts the function of an element which would otherwise have to be provided separately. The linear drive of the device according to the invention therefore has the advantage that an essential component can be saved. In addition, several installation steps, such as for example the removal of the protective cap, are eliminated.

Preferably, the protective cap has an open end with a fastening section which is placed onto a base of the gas generator.

Additionally parts for the sealing of the ignition unit can be dispensed with in that the cavity of the protective cap is sealed by an O-ring which is arranged in a groove provided in the base.

According to a further development of the invention, the protective cap has a front section adjoining the fastening section, and predetermined breaking site is formed in the transition region between the front section and the fastening section. Preferably, the fastening section has a greater cross-section than the front section. At least a part of the fastening section can be clamped between the base and a cylinder. For this, the cylinder preferably has an encircling step in the transition region between the fastening section and the front section. This further development is distinguished in that the protective cap can be reliably and firmly mounted on the gas generator, the function of the protective cap as movable function element however is nevertheless reliably ensured owing to the predetermined breaking site.

In a first preferred embodiment, provision is made that the protective cap adopts the function of a drive element for tensioning the belt. The protective cap therefore replaces the piston which serves as drive element in conventional belt tensioners with a pyrotechnic linear drive.

According to a second preferred embodiment, the tensioning device according to the invention comprises a force-limiting arrangement, and the protective cap adopts the function of a switching element of the force-limiting arrangement. By means of the protective cap, which in this case serves as push-rod or piston of a switchover system, the level of the force limitation can be set. For example, a force-limiting means, in particular a torsion rod, can be "switched on" or "off" by the movement of the protective cap.

DETAILED DESCRIPTION OF THE PREFERRED EMBODIMENTS

Figure 1:
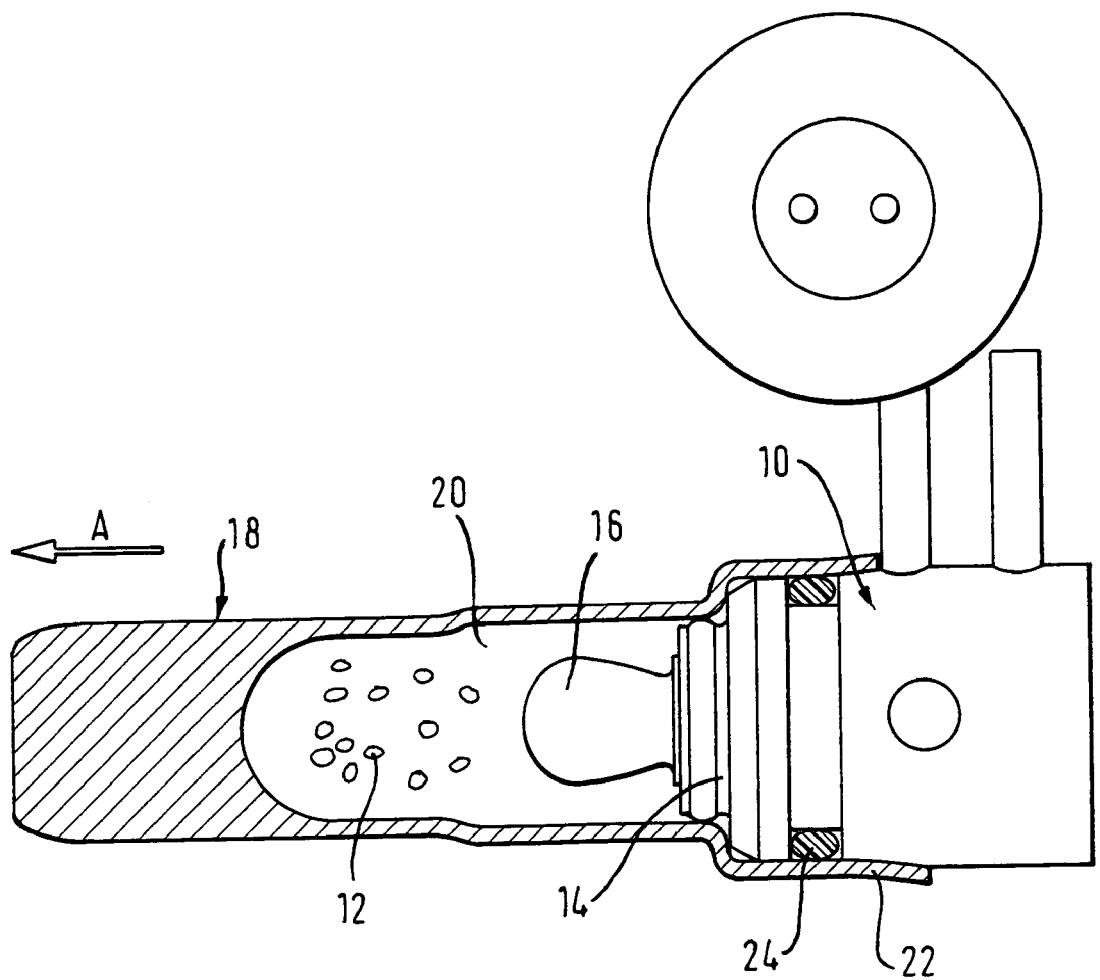
FIG. 1 shows a longitudinal section of a linear drive of a device according to the invention in accordance with a first example embodiment.

The pyrotechnic linear drive illustrated in FIG. 1 comprises a gas generator 10, known per se, arranged securely on the vehicle body. The gas generator 10 is equipped with a propellant charge 12 and an ignition unit in the form of an ignition pill 16 arranged on a base 14 of the gas generator 10. To secure the explosive parts of the gas generator 10 before and during the assembly, the linear drive further comprises a protective cap 18 with circular cross-section. In the protective cap 18 a cavity 20 is formed, in which both the ignition pill 16 and the propellant charge 12 are held. The protective cap 18 has an open rear end with a fastening section 22, which is placed on the base 14. The cavity 20 with the ignition pill 16 and the propellent charge 12 is sealed by means of an O-ring 24 arranged in an encircling groove of the base 14.

The protective cap 18 is not removed during or after the assembly of the linear drive. The protective cap 18 is rather designed so that in the installed state of the tensioning device it adopts the role of a function element in the case of release. The compressed gas occurring on ignition of the gas generator 10 in the cavity 20 of the protective cap 18 causes the fastening section 22 of the protective cap 18 to detach itself from the stationary base 14 of the gas generator 10. Further the protective cap 18 is caused to move in the direction of the arrow A on a given path away from the base 14.

According to a first embodiment, this movement of the protective cap 18 can be used for tensioning the safety belt. For this, the protective cap 18 is coupled, like a conventional drive piston, to the safety belt by a traction means or the like. According to an alternative second embodiment, in which the device comprises a force-limiting arrangement (not shown), the movement of the protective cap 18 can, however, be used for a switching process. The protective cap 18 in this case serves as switching element of a switchover system, by which a force-limiting means, for example a torsion rod, is "switched on", or "off".

Figure 2A:
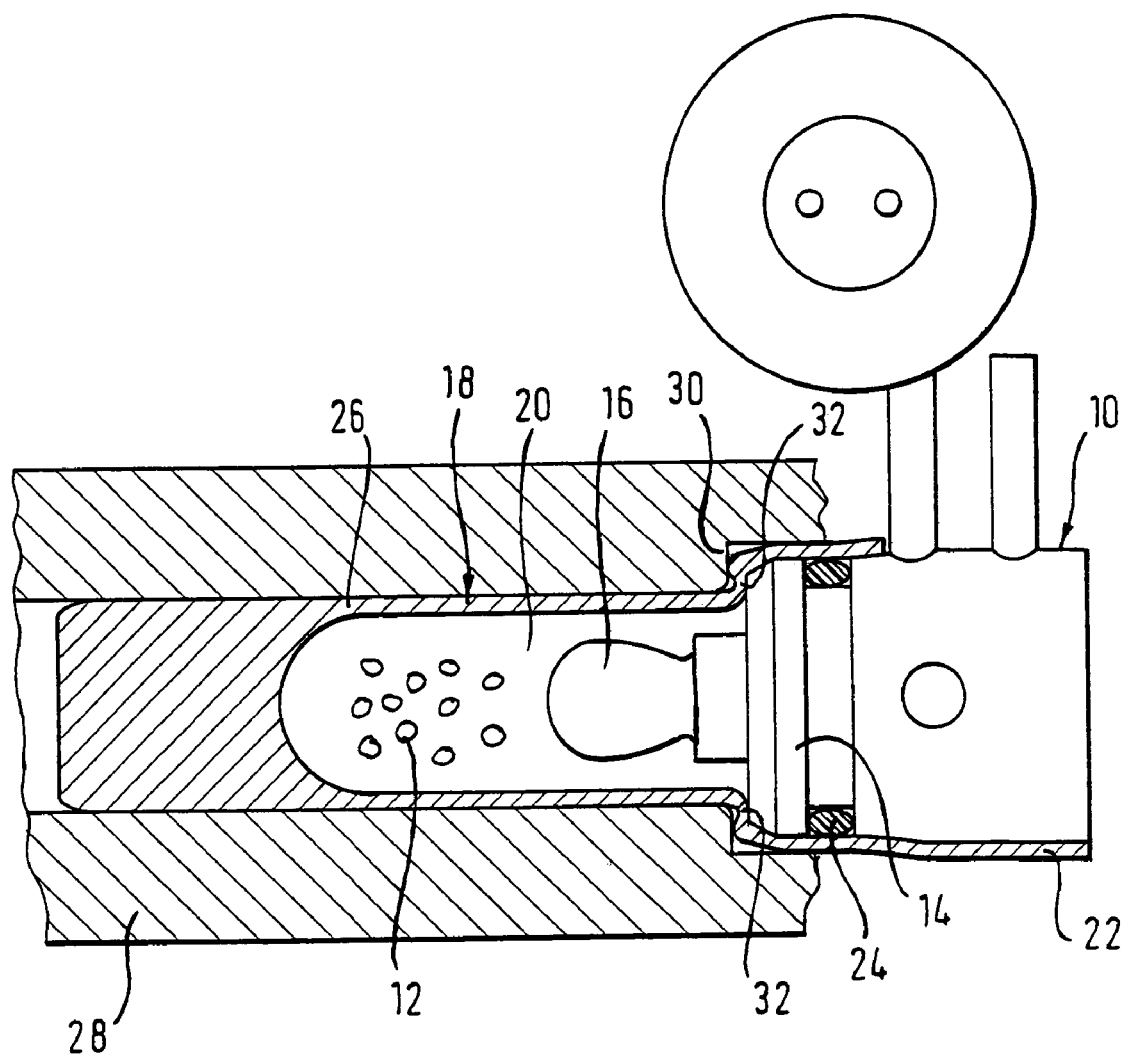
FIG. 2a shows a longitudinal section of a linear drive of a device according to the invention in accordance with a second example embodiment in normal state.
Figure 2B:
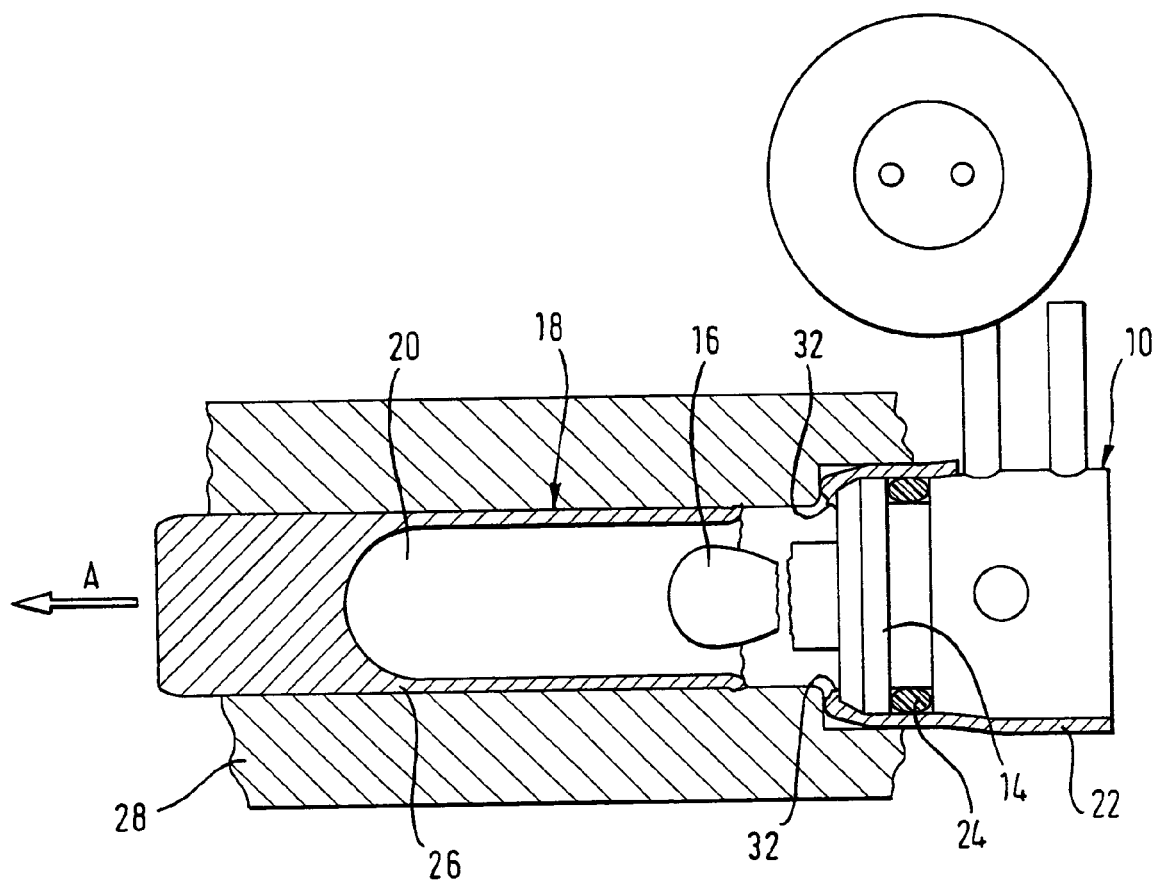
FIG. 2b shows the linear drive of FIG. 2 after ignition.

In FIGS. 2a and 2b, an alternative example embodiment of the linear drive of the device according to the invention is shown, the same reference numbers being used for the components which correspond to those of the example embodiment shown in FIG. 1. As in the previously described example embodiment, the protective cap 18 is placed onto a base 14 of the gas generator 10. A fastening section 22 of the cap 18, widened compared with the front section 26, conforms in shape to the base 14. The sealing of the cavity 20 likewise takes place by means of an O-ring 24. A part of the fastening section 22 and the front section 26 of the protective cap 18 adjoining thereto are surrounded by a cylinder 28 which provides a movement path for the protective cap 18 after igniting. In the transition zone between the front section 26 and the fastening section 22 of the protective cap 18, the cylinder 28 has an encircling step 30, so that the protective cap 18 is clamped. Thereby, a predetermined breaking site 32 between the cylinder 28 and the base 14 is formed (see FIG. 2a).

In FIG. 2b the linear drive is shown shortly after the igniting of the propellent charge 12. Through the pressure, which has occurred in the cavity 20, the protective cap 18 is torn apart along the predetermined breaking site 32, and the front section 26 of the protective cap 18 moves in the direction of the arrow A on the path of movement given by the cylinder 28, away from the base 14.

What is claimed is:

1. A device for tensioning a safety belt, the device comprising a pyrotechnic linear drive including
    a gas generator (10) comprising an ignition unit (16), and
    a protective cap (18) to secure the gas generator (10) before and during the assembly of the gas generator (10),
    characterized in that
    in the installed state of the device, at least a portion of the protective cap (18), after the igniting of the gas generator (10), represents a function element and,
    the protective cap (18) adopts the function of a drive element for tensioning the belt.

2. A device for tensioning a safety belt, the device comprising a pyrotechnic linear drive including
    a gas generator (10) comprising an ignition unit (16), and
    a protective cap (18) to secure the gas generator (10) before and during the assembly of the gas generator (10),
    characterized in that
    in the installed state of the device, at least a portion of the protective cap (18), after the igniting of the gas generator (10), represents a function element and,
    the device comprises a force-limiting arrangement and that the protective cap (18) adopts the function of a switching element of the force-limiting arrangement.

3. The device according to claim 2, characterized in that through a movement of the protective cap (18), a force-limiting means of the force-limiting arrangement, in particular a torsion rod, is activate.

4. A device for tensioning a safety belt, the device comprising a pyrotechnic linear drive including
    a gas generator (10) comprising an ignition unit (16), and
    a protective cap (18) to secure the gas generator (10) before and during the assembly of the gas generator (10),
    characterized in that
    in the installed state of the device, at least a portion of the protective cap (18), after the igniting of the gas generator (10), represents a function element
    the protective cap (18) has an open end with a fastening section (22), which is placed onto a base (14) of the gas generator (10) and,
    a cavity (20) of the protective cap (18) is sealed by an O-ring (24), which is arranged in a groove provided in the base (14).

5. A device for tensioning a safety belt, the device comprising a pyrotechnic linear drive including
    a gas generator (10) comprising an ignition unit (16), and
    a protective cap (18) to secure the gas generator (10) before and during the assembly of the gas generator (10),
    characterized in that
    in the installed state of the device, at least a portion of the protective cap (18), after the igniting of the gas generator (10), represents a function element,
    the protective cap (18) has an open end with a fastening section (22), which is placed onto a base (14) of the gas generator (10) and,
    the protective cap (18) has a front section (26) adjoining the fastening section (22) and that in the transition region between the front section (26) and the fastening section (22) a predetermined breaking site (32) is formed.

6. The device according to claim 5, characterized in that the fastening section (22) has a larger cross-section than the front section (26).

7. A device for tensioning a safety belt, the device comprising a pyrotechnic linear drive including
    a gas generator (10) comprising an ignition unit (16), and
    a protective cap (18) to secure the gas generator (10) before and during the assembly of the gas generator (10),
    characterized in that
    in the installed state of the device, at least a portion of the protective cap (18), after the igniting of the gas generator. (10), represents a function element,
    the protective cap (18) has an open end with a fastening section (22), which is placed onto a base (14) of the gas generator (10) and,
    at least a part of the fastening section (22) is clamped between the base (14) and a cylinder (28).

8. The device according to claim 7, characterized in that the cylinder (28) has an encircling step (30) in the transition zone between the fastening section (22) and a front section (26).

* * * * *

UNITED STATES PATENT AND TRADEMARK OFFICE
CERTIFICATE OF CORRECTION

| | |
|---|---|
| PATENT NO. | : 6,966,607 B2 |
| DATED | : November 22, 2005 |
| INVENTOR(S) | : Guenter Weyhmueller and Wilfried Bief |

It is certified that error appears in the above-identified patent and that said Letters Patent is hereby corrected as shown below:

<u>Column 4,</u>
Line 52, after "generator" delete ".".

Signed and Sealed this

Twenty-eighth Day of March, 2006

JON W. DUDAS
*Director of the United States Patent and Trademark Office*